US 12,446,424 B2

(12) United States Patent
Park et al.

(10) Patent No.: US 12,446,424 B2
(45) Date of Patent: Oct. 14, 2025

(54) DISPLAY DEVICE

(71) Applicant: Samsung Display Co., LTD., Yongin-si (KR)

(72) Inventors: Jae-Hyun Park, Yongin-si (KR); Yool Guk Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 738 days.

(21) Appl. No.: 17/865,578

(22) Filed: Jul. 15, 2022

(65) Prior Publication Data

US 2023/0145422 A1  May 11, 2023

(30) Foreign Application Priority Data

Nov. 9, 2021  (KR) .......................... 10-2021-0152885

(51) Int. Cl.
*H10K 59/131* (2023.01)
(52) U.S. Cl.
CPC ................................ *H10K 59/1315* (2023.02)
(58) Field of Classification Search
CPC ................................................. H10K 59/1315
USPC ........................................................... 257/40
See application file for complete search history.

(56) References Cited

U.S. PATENT DOCUMENTS

| 10,319,935 | B2 | 6/2019 | Nishimura et al. |
| 10,468,623 | B2 | 11/2019 | Ajiki et al. |
| 2020/0067016 | A1* | 2/2020 | Park .................. H10K 59/131 |
| 2021/0376037 | A1* | 12/2021 | You .................. H10K 59/1315 |
| 2023/0011322 | A1 | 1/2023 | Park |

FOREIGN PATENT DOCUMENTS

| KR | 1020050063407 U | 6/2005 |
| KR | 20070005321 A | 1/2007 |
| KR | 101066516 B1 | 9/2011 |
| KR | 20130025806 A | 3/2013 |
| KR | 1020230010866 A | 1/2023 |

* cited by examiner

*Primary Examiner* — Xia L Cross
(74) *Attorney, Agent, or Firm* — CANTOR COLBURN LLP

(57) ABSTRACT

A display device includes a substrate including a display area and a non-display area surrounding the display area, a common voltage transmission line which is disposed in the non-display area and transmits a common voltage, a common voltage line disposed in the display area and connected with the common voltage transmission line, a common electrode disposed in the display area and the non-display area and connected with the common voltage line, a first pad disposed in the non-display area and connected with the common electrode, and a second pad disposed in the non-display area and connected with the common voltage transmission line.

20 Claims, 11 Drawing Sheets

DISPLAY DEVICE

This application claims priority to Korean Patent Application No. 10-2021-0152885, filed on Nov. 9, 2021, and all the benefits accruing therefrom under 35 U.S.C. § 119, the content of which in its entirety is herein incorporated by reference.

BACKGROUND

1. Technical Field

Embodiments of the invention relate to a display device.

2. Description of the Related Art

As a display device, a light-emitting display device displaying an image by controlling the luminance of light-emitting elements and a liquid crystal display displaying an image by controlling the transmittance of a liquid crystal layer are widely used. The light-emitting display does not desire a separate light source such as a backlight unlike the liquid crystal display, and thus the thickness and weight of the display device may be reduced. In addition, the light-emitting display exhibits high quality characteristics such as low power consumption, high luminance, and high reaction speed.

Light-emitting elements (e.g., light-emitting diodes) of the light-emitting display may be disposed in a display area (corresponding to the screen) and may include a common electrode to which a common voltage is applied. The common electrode is connected to a common voltage transmission line that transmits the common voltage, and thus the common voltage may be applied.

SUMMARY

Due to the resistance of the common electrode and a consequent voltage drop, the level of the common voltage applied to the light-emitting elements may not be uniform. As a result, display quality such as luminance uniformity may deteriorate and power consumption may increase.

In order to reduce a drop of a common voltage due to the common electrode, wires that transmit the common voltage to the display area may include a low-resistance metal and the common electrode may be connected to the wires. Embodiments are to provide a display device that may improve a voltage drop in a common electrode and may measure contact resistance between the common electrode and wires.

A display device in an embodiment includes a substrate that includes a display area and a non-display area that surrounds the display area, a common voltage transmission line which is disposed in the non-display area and transmits a common voltage, a common voltage line disposed in the display area and connected with the common voltage transmission line, a common electrode disposed in the display area and the non-display area and connected with the common voltage line, a first pad disposed in the non-display area and connected with the common electrode, and a second pad disposed in the non-display area and connected with the common voltage transmission line.

In an embodiment, the first pad may be connected with the common electrode by a first connection wire, and the second pad may be connected with the common voltage transmission line by a second connection wire.

In an embodiment, each of the first pad and the second pad may include a first electrode layer and a second electrode layer disposed on the first electrode layer.

In an embodiment, the first connection wire may extend from the second electrode layer of the first pad, and the second connection wire may extend from the first electrode layer of the second pad.

In an embodiment, the first connection wire may be unitary with the second electrode layer of the first pad, and the second connection wire may be unitary with the first electrode layer of the second pad and the common voltage transmission line.

In an embodiment, the display device may further include a conductive layer disposed on the substrate and including a metal, an insulation layer disposed on the conductive layer, and a pixel electrode disposed on the insulation layer. The first connection wire may include a same material in a same process as that of the pixel electrode, while the second connection wire may include a same material in a same process as that of the conductive layer.

In an embodiment, the first connection wire may include a first portion including the same material in the same process as that of the conductive layer and a second portion including the same material in the same process as that of the pixel electrode.

In an embodiment, the first pad and the second pad may be respectively disposed at a first side and a second side of the display area.

In an embodiment, the first pad and the second pad may be disposed at a side of the display area.

In an embodiment, the display device may further include an insulation layer disposed on the common voltage line.

In an embodiment, the common electrode may be connected to the common voltage line through a contact hole defined in the insulation layer.

In an embodiment, the display device may further include a pixel electrode disposed on the insulation layer, and a contact member disposed between the common voltage line and the common electrode and contacting the common voltage line through the contact hole. The contact member may include a same material in a same process as that of the pixel electrode.

In an embodiment, the common electrode may contact a side surface of the common voltage line.

A display device in an embodiment includes a substrate including a display area and a non-display area surrounding the display area, a common voltage transmission line which is disposed in the non-display area and transmits a common voltage, a common voltage line disposed in the display area and connected with the common voltage transmission line, an insulation layer disposed on the common voltage transmission line and the common voltage line, a pixel electrode disposed on the insulation layer, a common electrode disposed in the display area and the non-display area and electrically connected with the common voltage line, a first connection wire disposed in the non-display area and connected with the common electrode, and a second connection wire disposed in the non-display area and connected with the common voltage transmission line.

In an embodiment, the display device may further include a conductive layer disposed between the substrate and the insulation layer, and including a metal. The first connection wire may include a portion including a same material in a same process as that of the pixel electrode, and the second connection wire may include a portion including a same material in a same process as that of the conductive layer.

In an embodiment, the first connection wire may have a triple layer structure of a transparent conductive oxide layer, a metal layer, and a transparent conductive oxide layer.

In an embodiment, the first connection wire and the second connection wire may be respectively disposed at opposite sides of the display area.

In an embodiment, the display device may further include a first pad disposed in the non-display area and connected with the first connection wire, and a second pad disposed in the non-display area and connected with the second connection wire.

In an embodiment, each of the first pad and the second pad may include a first electrode layer and a second electrode layer disposed on the first electrode layer. The first connection wire may be connected with the second electrode layer of the first pad, and the second connection wire may be connected with the first electrode layer of the second pad.

In an embodiment, the first connection wire may be unitary with the second electrode layer of the first pad, and the second connection wire may be unitary with the first electrode layer of the second pad and the common voltage transmission line.

In an embodiment, the common voltage transmission line may surround the display area, and opposite ends of the common voltage line may be connected with the common voltage transmission line.

By the embodiments, a display device that may improve a voltage drop at the common electrode and measure the contact resistance between the common electrode and wires may be provided.

In addition, by the embodiments, a contact failure portion of the common electrode in the display area may be estimated and the contact failure portion may be repaired by measuring the resistance between a pair of pads that may apply a voltage to the common electrode.

In addition, in embodiments, there is an advantageous effect that may be recognized throughout the specification.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
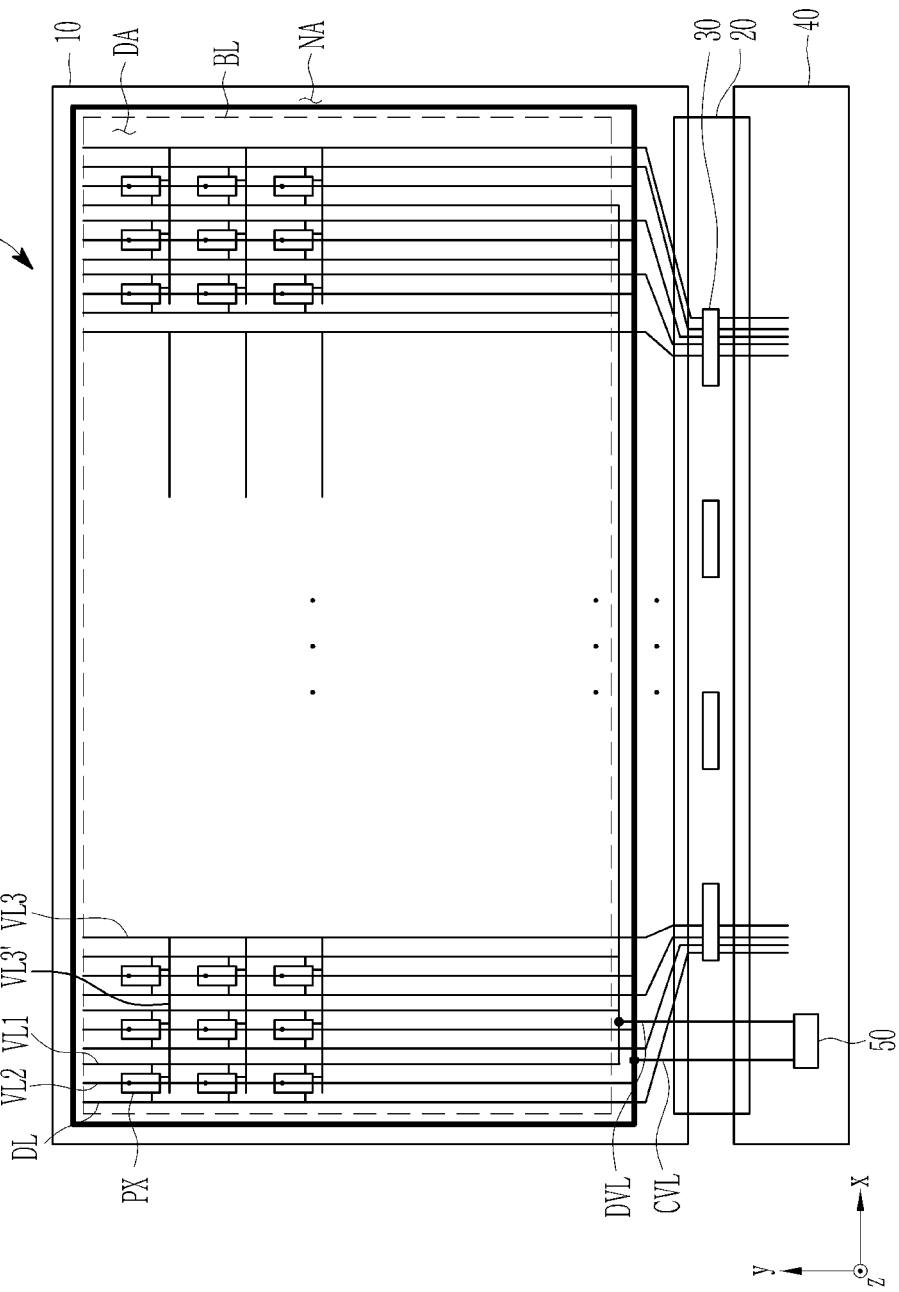
FIG. 1 is a schematic top plan view of an embodiment of a display device.

Hereinafter, embodiments will be described more fully with reference to the accompanying drawings, in which embodiments are shown.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

In the specification, unless explicitly described to the contrary, the word "comprise" and variations such as "comprises" or "comprising" will be understood to imply the inclusion of stated elements but not the exclusion of any other elements. When "connected to" in the entire specification, this does not only mean that two or more constituent elements are directly connected, but also means that two or more constituent elements are indirectly connected, physically connected, and electrically connected through other constituent elements, or being referred to by different names depending on the position or function, while being integral.

In the drawings, the signs "x", "y", and "z" are used to indicate directions, where "x" is a first direction, "y" is a second direction that is perpendicular to the first direction, and "z" is a third direction that is perpendicular to the first direction and the second direction. The first direction x, the second direction y, and the third direction z may correspond to a horizontal direction, a vertical direction, and a thickness direction of the display device, respectively.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

FIG. 1 is a schematic top plan view of an embodiment of a display device.

Referring to FIG. 1, a display device 1 may include a display panel 10, a flexible printed circuit film 20, a driver integrated circuit ("IC") chip 30, a printed circuit board 40, and a power module 50.

The display panel 10 may include a display area DA corresponding to a screen where an image is displayed, and a non-display area NA where circuits and/or wires for generating and/or transmitting various signals applied to the display area DA. The non-display area NA may surround the display area DA. In FIG. 1, an inner region and an outer region with reference to the boundary line BL may be the display area DA and the non-display area NA, respectively.

In the display area DA of the display panel 10, pixels PX may be disposed in a matrix form. However, the invention is not limited thereto, and pixels PX may be disposed in various other shapes. In addition, a data line DL transmitting a data voltage VDATA, a driving voltage line VL1 transmitting a driving voltage ELvDD, a common voltage line VL2 transmitting a common voltage $EL_{VSS}$, and an initialization voltage line VL3 transmitting an initialization voltage VINT may be disposed in the display area DA. The driving voltage line VL1, the common voltage line VL2, and the initialization voltage line VL3 may extend in a second direction y. The initialization voltage line VL3 may include a branch voltage line VL3' extending in a first direction x. Each pixel PX may receive the data voltage VDATA, the driving voltage ELvDD, the common voltage $EL_{VSS}$, and the initialization voltage VINT from the wires. The driving voltage ELvDD and the common voltage $EL_{VSS}$ may be power source voltages applied to each pixel PX, and the driving voltage line VL1 and the common voltage line VL2 respectively transmitting the driving voltage ELvDD and the common voltage $EL_{VSS}$ may be referred to as power source voltage lines. The power source voltage line may include a low-resistance metal or a metal alloy. A voltage level of the driving voltage ELvDD may be higher than a voltage level of the common voltage $EL_{VSS}$. The driving voltage ELvDD may be also referred to as a first power source voltage or a high-potential power source voltage. The common voltage $EL_{VSS}$ may be also referred to as a second power source voltage or a low-potential power source voltage.

A gate driver (not shown) may be disposed at opposite sides of the display area DA in the non-display area NA of the display panel 10. The gate driver may be integrated in the non-display area NA. The pixels PX may receive a data voltage VDATA at predetermined timing by receiving a gate signal (also referred to as a scan signal) generated by the gate driver.

A driving voltage transmission line DVL connected to the driving voltage lines VL1 and a common voltage transmission line CVL connected to the common voltage lines VL2 may be disposed in the non-display area NA of the display panel 10. The driving voltage transmission line DVL and the common voltage transmission line CVL may include portions extending approximately in the second direction y and portions extending approximately in the first direction x, respectively.

The common voltage transmission line CVL may surround the display area DA. The common voltage lines VL2 may be connected to the common voltage transmission line CVL at the lower and upper sides of the display area DA, thereby uniformly supplying a common voltage throughout the display area DA. The common voltage lines VL2 may be unitary with the common voltage transmission line CVL.

One end (e.g., upper end in FIG. 1) of the flexible printed circuit film 20 may be connected or bonded to the display panel 10, and an opposite end (e.g., lower end in FIG. 1) may be connected or bonded to the printed circuit board 40. A driver IC chip 30 including a data driver that applies a data voltage VDATA to the data line DL may be disposed on the flexible printed circuit film 20.

A power module 50 that generates a power source voltage such as a driving voltage ELvDD, a common voltage $EL_{VSS}$, or the like may be disposed in the printed circuit board 40. The power module 50 may be provided in the form of an IC chip. A signal controller (not shown) that controls the data driver and gate driver may be disposed on the printed circuit board 40.

Figure 2:
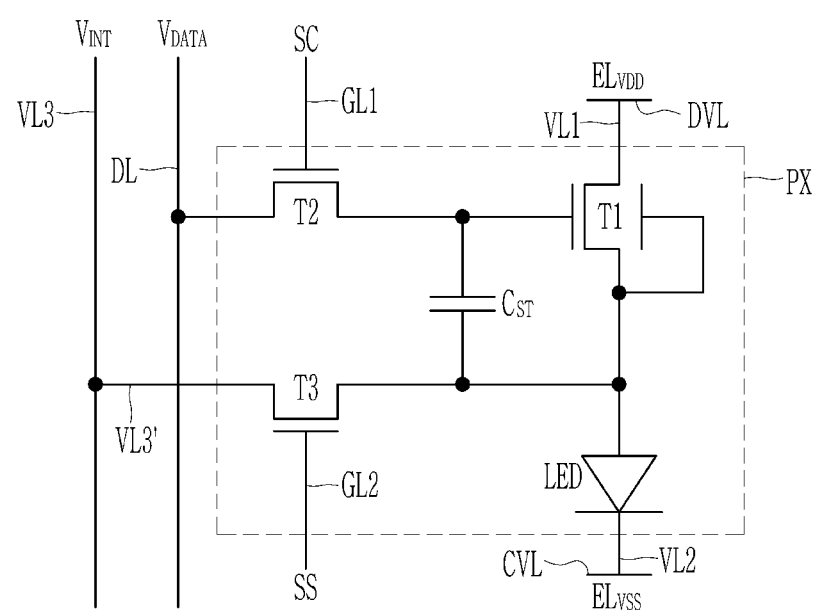
FIG. 2 and FIG. 3 are circuit diagrams of an embodiment of a pixel of the display device, respectively.
Figure 3:
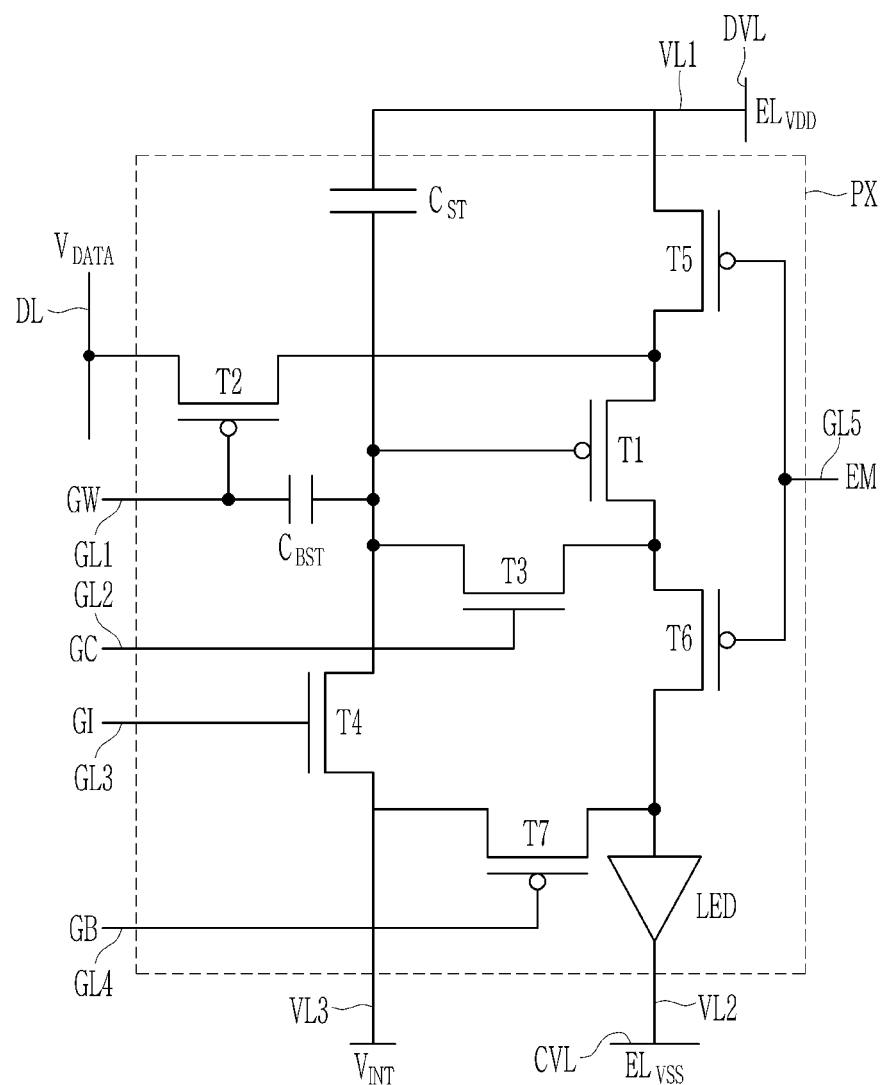

FIG. 2 and FIG. 3 are circuit diagrams of an embodiment of a pixel of the display device, respectively.

Referring to FIG. 2, one pixel PX includes first to third transistors T1 to T3, a storage capacitor $C_{ST}$, and a light-emitting diode LED. The light-emitting diode LED may be an organic or inorganic light-emitting diode. The first to third transistors T1 to T3 may be N-type transistors, but the invention is not limited thereto, and in another embodiment, at least some of the first to third transistors T1 to T3 may be P-type transistors.

A gate electrode of the first transistor T1 may be connected with a first electrode of the storage capacitor $C_{ST}$. A first electrode of the first transistor T1 may be connected with the driving voltage line VL1 of the driving voltage ELvDD, and a second electrode of the first transistor T1 may be connected with an anode of the light-emitting diode LED and a second electrode of the storage capacitor $C_{ST}$. The first transistor T1 receives the data voltage VDATA according to a switching operation of the second transistor T2 and thus may supply a driving current to the light-emitting diode LED according to a voltage stored in the storage capacitor $C_{ST}$.

A gate electrode of the second transistor T2 may be connected with a first gate line GL1 that transmits a first scan signal SC. A first electrode of the second transistor T2 may be connected with the data line DL that may transmit the data voltage VDATA or a reference voltage. A second electrode of the second transistor T2 may be connected with the first electrode of the storage capacitor $C_{ST}$ and the gate electrode of the first transistor T1. The second transistor T2 is turned on according to the first scan signal SC and thus may transmit the reference voltage or data voltage VDATA to the gate electrode of the first transistor T1.

A gate electrode of the third transistor T3 may be connected with a second gate line GL2 transmitting a second scan signal SS. A first electrode of the third transistor T3 may be connected with the second electrode of the storage capacitor $C_{ST}$, the second electrode of the first transistor, and the first electrode of the light-emitting diode LED. The second electrode of the third transistor T3 may be connected with an initialization voltage line VL3 transmitting an initialization voltage VINT. The third transistor T3 is turned on according to the second scan signal SS and transmits the initialization voltage VINT to the anode to initialize the anode voltage.

The first electrode of the storage capacitor $C_{ST}$ may be connected with the gate electrode of the first transistor T1, and the second electrode of the storage capacitor $C_{ST}$ may be connected with the first electrode of the third transistor T3, and the anode. A cathode of the light-emitting diode LED may be connected with the common voltage line VL2 transmitting the common voltage (also referred to as cathode common voltage) $EL_{VSS}$. Each of the light-emitting diodes LED may form one pixel PX, and anodes and cathodes of the light-emitting diodes may be also respectively referred to as pixel electrodes and common electrodes.

The light-emitting diode LED may emit light (grayscale light) according to the driving current generated by the first transistor T1.

An embodiment of the operation of the circuit shown in FIG. 2, particularly the operation for one frame, will be described with an example in which the transistors T1 to T3 are all N-type channel transistors.

When one frame starts, a first scan signal SC having a high-level and a second scan signal SS having a high-level are supplied in an initialization section, and thus the second transistor T2 and the third transistor T3 may be turned on. The reference voltage from the data line DL may be supplied to the reference voltage gate electrode of the first transistor T1 and the first electrode of the storage capacitor $C_{ST}$ through the turned-on second transistor T2, and the initialization voltage VINT may be supplied to the second electrode of the first transistor T1 and the anode through the turned-on third transistor T3. Accordingly, the anode may be initialized to the initialization voltage VINT during the initialization period. A voltage difference between the reference voltage and the initialization voltage VINT may be stored in the storage capacitor $C_{ST}$.

Next, in a sensing period, when the second scan signal SS becomes a low level while the first scan signal SC of a high level is maintained, the second transistor T2 may maintain the turned-on state and the third transistor T3 may be turned off.

The gate electrode of the first transistor T1 and the first electrode of the storage capacitor $C_{ST}$ may maintain the reference voltage through the turned-on second transistor T2, and the second electrode of the first transistor T1 and the anode may be disconnected from the initialization voltage VINT through the turned-off third transistor T3.

Accordingly, when a current flows from the first electrode to the second electrode of the first transistor T1 and the voltage of the second electrode of the first transistor T1 becomes a reference voltage-$V_{TH}$ voltage, the first transistor T1 may be turned off.

$V_{TH}$ denotes a threshold voltage of the first transistor T1. In this case, a voltage difference of the gate electrode and the second electrode of the first transistor T1 may be stored in the storage capacitor $C_{ST}$, and sensing of the threshold voltage $V_{TH}$ of the first transistor T1 may be completed. As a compensated data signal compensated by reflecting the characteristic information sensed during the sensing section is generated, it is possible to compensate for the characteristic deviation of the first transistor T1, which may be different for each pixel PX.

Next, in a data input period, when a first scan signal SC having a high-level is supplied and a second scan signal SS having a low-level is supplied, the second transistor T2 may be turned on and the third transistor T3 may be turned off. The data voltage VDATA from the data line DL may be supplied to the gate electrode of the first transistor T1 and the first electrode of the storage capacitor $C_{ST}$ through the turned-on second transistor T2. In this case, the second electrode of the first transistor T1 and the anode may substantially maintain the potential in the sensing period by the first transistor T1 in the turned-off state.

Next, in a light emission period, the first transistor T1 turned on by the data voltage VDATA transmitted to the gate electrode of the first transistor T1 may generate a driving current according to the data voltage VDATA, and the light-emitting diode LED may emit light by the driving current. That is, luminance of the light-emitting diode LED may be adjusted by adjusting the driving current applied to the light-emitting diode LED according to the magnitude of the data voltage VDATA applied to the pixel PX.

Referring to FIG. 3, a pixel having a different configuration from the pixel shown in FIG. 2 is illustrated.

One pixel PX may include first to seventh transistors T1 to T7, a storage capacitor $C_{ST}$, a boost capacitor $C_{BST}$, and a light-emitting diode LED. First, second, fifth, sixth, and seventh transistors T1, T2, T5, T6, and T7 may be P-type transistors, and third and fourth transistors T3 and T4 may be N-type transistors, but the invention is not limited thereto, and in another embodiment, types of transistors may be changed.

In an embodiment, the first transistor T1 may be a transistor that adjusts intensity of a driving current output to an anode of a light-emitting diode LED according to a data voltage VDATA applied to a gate electrode of the first transistor T1. The gate electrode of the first transistor T1 may be connected to a first electrode of a storage capacitor $C_{ST}$. A first electrode of the first transistor T1 may be connected with a second electrode of the second transistor T2, and may be connected with the driving voltage line VL1 via the fifth transistor T5. The second electrode of the first transistor T1 may be connected with the anode of the light-emitting diode LED via the sixth transistor T6.

A gate electrode of the second transistor T2 may be connected with a first gate line GL1, and may be connected with a first electrode of a boost capacitor $C_{BST}$. The first electrode of the second transistor T2 may be connected with a data line DL, and the second electrode of the second transistor may be connected with the first electrode of the first transistor T1. When the second transistor T2 is turned on by a scan signal GW having a low-level and transmitted through the first gate line GL1, the data voltage VDATA transmitted through the data line DL may be transmitted to the first electrode of the first transistor T1.

The third transistor T3 may electrically connect the second electrode and the gate electrode of the first transistor T1. As a result, a compensation voltage compensated from the data voltage VDATA through the first transistor T1 may be transmitted to the first electrode of the storage capacitor $C_{ST}$. A gate electrode of the third transistor T3 may be connected with a second gate line GL2, and a first electrode of the third transistor T3 may be connected with the second electrode of the first transistor T1. The second electrode of the third transistor T3 may be connected with the first electrode of the storage capacitor $C_{ST}$, the gate electrode of the first transistor T1, and the second electrode of the boost capacitor $C_{BST}$. When the second gate line GL2 of the third transistor T3 is turned by an inversion scan signal GC having a high-level, the third transistor T3 may connect the gate electrode of the first transistor T1 and the second electrode of the boost capacitor $C_{BST}$. A voltage applied to the gate electrode of the first transistor T1 may be stored in the storage capacitor $C_{ST}$, and the storage capacitor $C_{ST}$ may maintain the voltage of the gate electrode of the first transistor T1 to be constant for one frame.

A gate electrode of the fourth transistor T4 may be connected with a third gate line GL3, and a first electrode of the fourth transistor T4 may be connected with an initialization voltage line VL3. A second electrode of the fourth transistor T4 may be connected to the first electrode of the storage capacitor $C_{ST}$, the gate electrode of the first transistor T1, and the second electrode of the boost capacitor $C_{BST}$. The fourth transistor T4 may be turned on by an initialization voltage GI having a high-level transmitted through the third gate line GL3, and may transmit the initialization voltage VINT to the gate electrode of the first transistor T1 and the first electrode of the storage capacitor $C_{ST}$.

The fifth transistor T5 may transmit a driving voltage ELvDD to the first transistor T1 by an emission signal EM having a low-level. A gate electrode of the fifth transistor T5 may be connected with a fifth gate line GL5, a first electrode of the fifth transistor T5 may be connected with a driving voltage line VL1, and a second electrode of the fifth transistor T5 may be connected with the first electrode of the first transistor T1.

The sixth transistor T6 may transmit a driving current output from the first transistor T1 to the light emitting diode LED by the emission signal EM having a low-level. A gate electrode of the sixth transistor T6 may be connected with the fifth gate line GL5, a first electrode of the sixth transistor T6 may be connected with the second electrode of the first transistor T1, and a second electrode of the sixth transistor T6 may be connected with the anode.

A gate electrode of the seventh transistor T7 may be connected with a fourth gate line GL4, a first electrode of the seventh transistor T7 may be connected with the anode, and a second electrode of the seventh transistor T7 may be connected with the initialization voltage line VL3. When the seventh transistor T7 is turned on by a bypass signal GB having a low-level, the initialization voltage VINT may be applied to the anode.

The second electrode of the storage capacitor $C_{ST}$ may be connected with the driving voltage line VL1. The cathode of the light-emitting diode LED may be connected with a common voltage line VL2 transmitting a common voltage $EL_{VSS}$.

When a high voltage is applied to the first gate line GL1, a low voltage may be applied to the second gate line GL2, and when a low voltage is applied to the first gate line GL1, a high voltage may be applied to the second gate line GL2. Since an inversion scan signal GC applied to the second gate line GL2 is an inverted signal from the scan signal GW applied to the first gate line GL1, the gate voltage of the first transistor T1 may be reduced after the data voltage VDATA is written. On the contrary, the scan signal GW may raise the gate voltage of the first transistor T1. Since the boost capacitor $C_{BST}$ is disposed between the first gate line GL1 and the gate electrode of the first transistor T1, the gate voltage of the first transistor T1 may be stabilized. The boost capacitor $C_{BST}$ may compensate the increase or decrease of the gate voltage of the first transistor T1 when the inversion scan signal GC is changed to a high voltage or changed to a low voltage.

The pixel PX shown in FIG. 2 includes three transistors T1 to T3 and one storage capacitor $C_{ST}$, and the pixel PX shown in FIG. 3 includes seven transistors T1 to T7, one storage capacitor $C_{ST}$, and one boost capacitor $C_{BST}$. However, the number of transistors, the number of capacitors, and a connection relationship therebetween may be variously modified.

Figure 4:
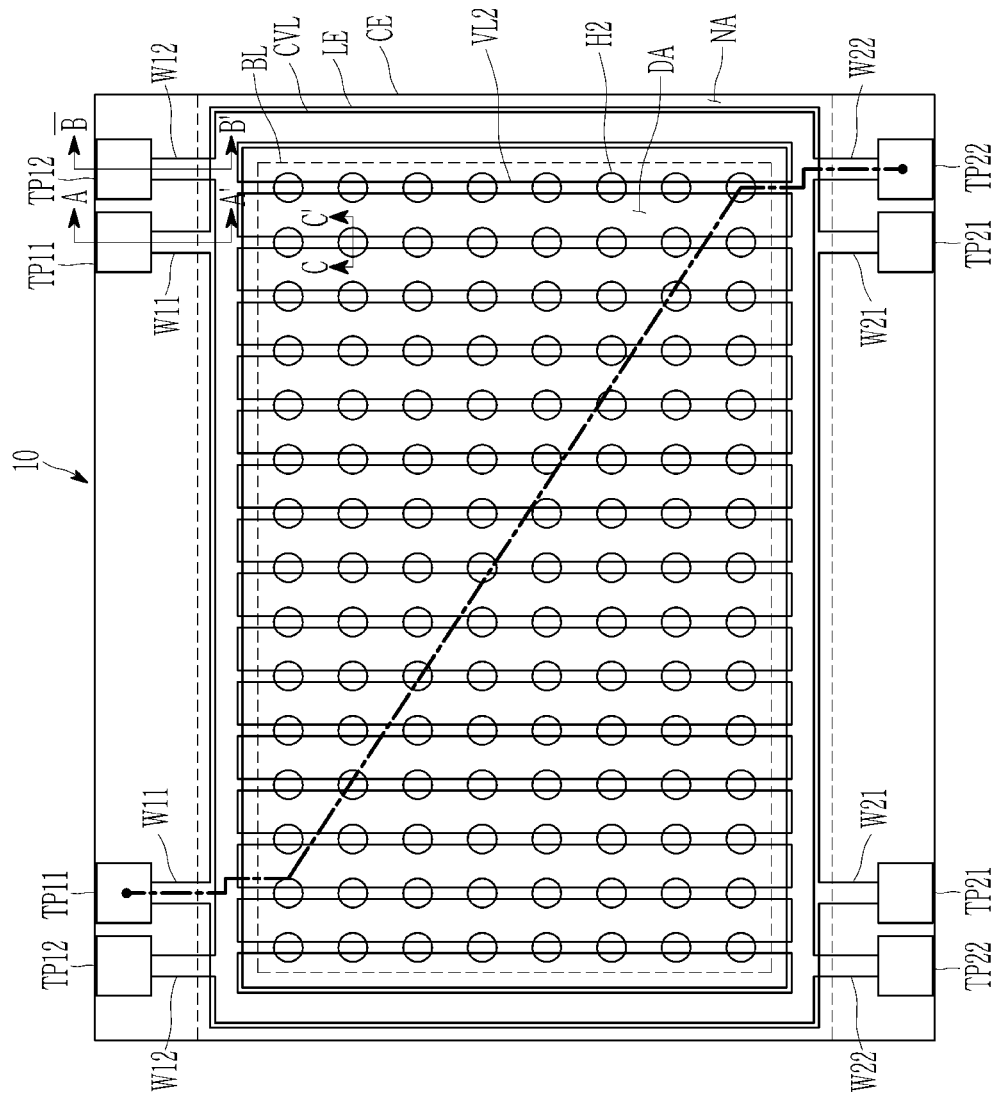
FIG. 4 is a schematic top plan view of an embodiment of a display device.
Figure 5:
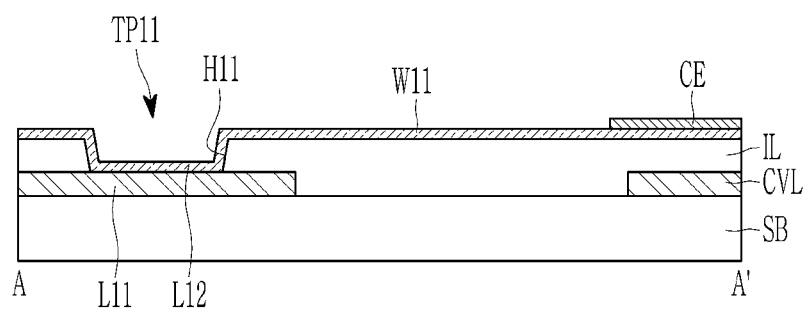
FIG. 5 and FIG. 6 are schematic cross-sectional views of the embodiment of FIG. 4, taken along line A-A'.
Figure 6:
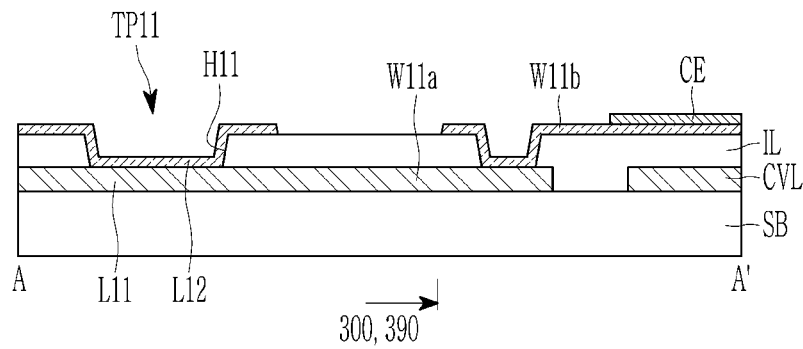
Figure 7:
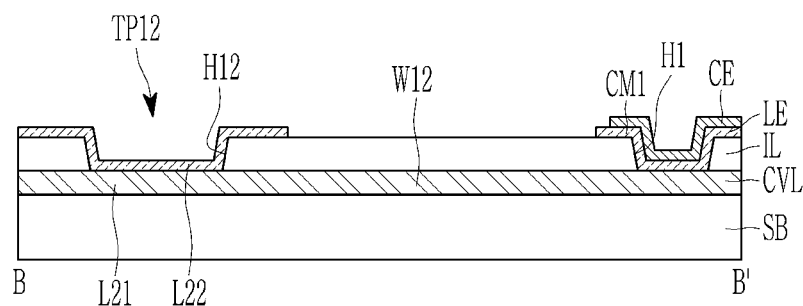
FIG. 7 is a schematic cross-sectional view of the embodiment of FIG. 4, taken along line B-B'.
Figure 8:
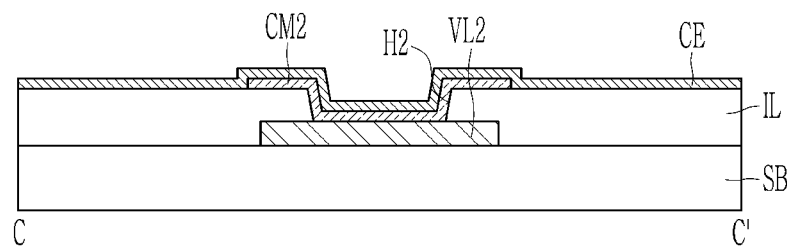
FIG. 8 is a schematic cross-sectional view of the embodiment of FIG. 4, taken along line C-C'.

FIG. 4 is a schematic top plan view of an embodiment of a display device in an embodiment, FIG. 5 and FIG. 6 are schematic cross-sectional views of the embodiment of FIG. 4, taken along line A-A', FIG. 7 is a schematic cross-sectional view of the embodiment of FIG. 4, taken along line B-B', and FIG. 8 is a schematic cross-sectional view of the embodiment of FIG. 4, taken along line C-C'.

FIG. 4 to FIG. 8 mainly illustrate an embodiment of constituent elements related particularly to a common voltage $EL_{VSS}$ in a display panel 10.

Referring to FIG. 4 to FIG. 8, the display panel 10 includes a substrate SB, and constituent elements of the display panel 10 may be disposed on the substrate SB. The substrate SB may include a display area DA and a non-display area NA surrounding the display area DA. The display area DA and the non-display area NA of the substrate SB may correspond to the display area DA and the non-display area NA of the display panel 10.

A common voltage transmission line CVL may be disposed on the substrate SB. The common voltage transmission line CVL may be disposed at at least one side of the display area DA, and as shown in the drawing, may surround the display area DA. The common voltage transmission line CVL may surround a part of the display area DA, and for example, may be disposed above and below the display area DA.

Common voltage lines VL2 may be disposed on the substrate SB. The common voltage lines VL2 may extend in a second direction y across the display area DA. In an embodiment, the common voltage lines VL2 may be connected to the common voltage transmission line CVL in the non-display area NA. In an embodiment, the common voltage lines VL2 may be unitary with the common voltage transmission line CVL. The common voltage lines VL2 may be disposed at predetermined intervals along the first direction x. As the common voltage lines VL2 are formed or provided in such a way, the common voltage $EL_{VSS}$ may be uniformly transmitted into the display area DA.

An insulation layer IL may be disposed on the common voltage transmission line CVL and the common voltage lines VL2. Although one insulation layer IL is illustrated, a plurality of insulation layers, which may include an inorganic or organic insulating material, may be disposed on the substrate SB. The insulation layer that may be disposed on the substrate SB will be described later with reference to FIG. 13.

An electrode CE that covers the display area DA may be disposed on the insulation layer IL. The common electrode CE may be disposed over the display area DA and the non-display area NA. Several constituent elements such as a transistor, a wire, a pixel electrode, and an emission layer of a light-emitting diode are disposed between the substrate SB and the common electrode CE, but they may be omitted to clearly show the characteristics of the embodiment. The common electrode CE may overlap the common voltage transmission line CVL. The common electrode CE may be connected to the common voltage transmission line CVL through a contact hole H1 defined in the insulation layer IL in the non-display area NA. The common electrode CE may be connected to the common voltage line VL2 through a contact hole H2 defined in the insulation layer IL in the display area DA.

In an embodiment, the common electrode CE may include a transparent conductive oxide such as an indium tin oxide ("ITO"), an indium zinc oxide ("IZO"), or the like, or may include a transparent conductive oxide. The common voltage transmission line CVL and common voltage lines VL2 may include a metal, which is a material having lower resistivity than the common electrode CE, or may include a metal. The common electrode CE is connected to the common voltage transmission line CVL in the non-display area NA to receive the common voltage $EL_{VSS}$, and the common electrode CE may be connected to the common voltage lines VL2 in the display area DA to receive the common voltage $EL_{VSS}$. Thus, the common voltage $EL_{VSS}$ may be uniformly applied to the common electrode CE throughout the display area DA, and a voltage drop due to the common electrode CE may be improved.

A contact member CM1 may be disposed between the common electrode CE and the common voltage transmission line CVL. The contact member CM1 may contact and be electrically connected to the common voltage transmission line CVL through the contact hole H1. A contact member CM2 may be disposed between the common electrode CE and the common voltage line VL2. The contact member CM2 may contact and be electrically connected to the common voltage line VL2 through the contact hole H2.

The contact members CM1 and CM2 may improve the adherence between the common voltage transmission line CVL and the common voltage line VL2, which are respectively in contact, and the common electrode CE, and may prevent oxidation of the common voltage transmission line CVL and the common voltage line VL2. In an embodiment, when the upper layer of the common voltage transmission line CVL and the common voltage line VL2 includes copper, oxidation of copper may be prevented. For this, in an embodiment, the contact members CM1 and CM2 may include a conductive material that may prevent corrosion of the upper layer of the common voltage transmission line CVL and the common voltage line VL2, for example, a transparent conductive oxide such as ITO, an IZO, or the like. The contact members CM1 and CM2 may include the same material in the same process as that of the pixel electrode, and may have a triple-layer structure of a transparent conductive oxide layer, a metal layer, and a transparent conductive oxide layer, for example, ITO/silver (Ag)/ITO. Although it is not illustrated, an insulation layer (e.g., a pixel defining layer 360 in FIG. 14, which will be described later) may be between the contact members CM1 and CM2 and the common electrode CE, and the common electrode CE may be connected to the contact members CM1 and CM2 through a contact hole defined in the insulation layer.

Pads TP11, TP12, TP21, and TP22 may be disposed on the substrate SB. The pads TP11, TP12, TP21, and TP22 may be disposed in the non-display area NA, and may be disposed more outward than the common electrode CE and the common voltage transmission line CVL. The pads TP11, TP12, TP21, and TP22 may include a first pad TP11 and a second pad TP12 that are connected to the common electrode CE and the common voltage transmission line CVL, respectively, from an upper side of the display area DA, and a first pad TP21 and a second pad TP 22 that are connected to the common electrode CE and the common voltage transmission line CVL respectively from a lower side of the display area DA. The pads TP11, TP12, TP21, and TP22 may be used to determine whether the contact resistance between the common electrode CE and the common voltage lines VL2 is abnormal in electrical inspection of the display panel 10, for example, in the display area DA. The second pads TP12 and TP22 may be pads used to apply a common voltage to the common voltage transmission line CVL when the display panel 10 is driven.

The first pads TP11 and TP21 may include a first electrode layer L11 and a second electrode layer L12. The second electrode layer L12 may be connected to the first electrode layer L11 through a contact hole H11 defined in the insulation layer IL. The second electrode layer L12 may be an uppermost layer and may be exposed to the outside. The second pads TP12 and TP22 may include a first electrode layer L21 and a second electrode layer L22. The second electrode layer L22 may be connected to the first electrode layer L21 through a contact hole H12 defined in the insulation layer IL. The second electrode layer L22 may be an uppermost layer and may be exposed to the outside. The first electrode layers L11 and L21 may include the same material in the same process as that of the common voltage transmission line CVL. The second electrode layers L12 and L22 may include the same material through the same process as that of the contact members CM1 and CM2. The first pads TP11 and TP21 may further include at least one electrode layer between the first electrode layer L11 and the second electrode layer L12. The second pads TP12 and TP22 may further include at least one electrode layer between the first electrode layer L21 and the second electrode layer L22.

The first pad TP11 may be connected to the common electrode CE by the first connection wire W11 and the second pad TP12 may be connected to the common voltage transmission line CVL by the second connection wire W12 in the upper side of the display area DA. In the lower side of the display area DA, the first pad TP21 may be connected to the common electrode CE by the first connection wire W21, and the second pad TP22 may be connected to the common voltage transmission line CVL by the second connection wire W22. Therefore, the first pads TP11 and TP21 may be connected to the common electrode CE, which may be a transparent conductive oxide layer, in the non-display area NA, and the second pads TP21 and TP22 may be connected to the common voltage transmission line CVL, which may be a metal layer, in the non-display area NA. Although it is not illustrated, an insulation layer (e.g., the pixel defining layer 360, which will be described later) may be disposed on the first connection wires W11 and W21, and the common electrode CE may be connected to the first connection wires W11 and W21 through a contact hole defined in the insulation layer.

Referring to FIG. 5, the first connection wires W11 and W21 may extend from the second electrode layer L12 of the first pads TP11 and TP21. The first connection wires W11 and W21 may be unitary with the second electrode layer L12 of the first pads TP11, and TP21. In an embodiment, the first connection wires W11 and W21 may be connected with the second electrode layer L12 of the first pads TP11 and TP21

Referring to FIG. 6, the first connection wire W11 may include a first portion W11*a* and a second portion W11*b*. The first portion W11*a* may extend from the first electrode layer L11 of the first pad TP11, and the second portion W11*b* may be connected to the common electrode CE. The first portion W11*a* may be disposed between the substrate SB and the insulation layer IL, and the second portion W11*b* may be disposed on the insulation layer IL. In another embodiment, the first portion W11*a* may be connected to the first electrode layer L11 of the first pad TP11. The second portion W11*b* may be connected to the first portion W11*a* through a contact hole defined in the insulation layer IL. The second portion W11*b* may be disposed inside a sealant 300 or covered by an encapsulation layer 390 to be described later (refer to FIG. 14). When the first connection wire W11 is formed or provided in such a way, the first portion W11a may be protected by the insulation layer IL even though it is disposed outside a sealant 300 or the encapsulation layer 390 because the first portion W11a is covered by the insulation layer IL. In addition, since the insulation layer IL is disposed on the insulation layer IL, the second portion W11b, which may be vulnerable to moisture or oxygen, may be protected by the sealant 300 and/or the encapsulation layer 390. Thus, the reliability of the first connection wire W11 that connects the common electrode CE to the first pad TP11 disposed on the outside of the display panel 10 may be improved. Although it is not shown, the first connection wire W21 may also include first and second portions configured like the first and second portions W11a and W11b of the first connection wire W11. Referring to FIG. 7, the second connection wires W12 and W22 may extend from the first electrode layer L21 of the second pads TP12 and TP22. The second connection wires W12 and W22 may be unitary with the first electrode layer L21 of the second pads TP12 and TP22. In another embodiment, the second connection wires W12 and W22 may be connected to the first electrode layer L21 of the second pads TP12 and TP22.

The first connection wires W11 and W21 illustrated in FIG. 5 may include a transparent conductive oxide and a metal layer. The first connection wires W11 and W21 may include the same material in the same process as that of the pixel electrode. The first connection wires W11 and W21 may include the same material in the same process as that of the common electrode CE. In the first connection wire W11 shown in FIG. 6, the first portion W11a may include a metal. The first portion W11a may include the same material in the same process as that of the common voltage transmission line CVL. The first portion W11a may include the same material in the same process as that of a gate electrode GE, which will be described later. The second portion W11b may include a transparent conductive oxide and a metal layer. The second portion W11b may include the same material as that of the pixel electrode in the same process. The second portion W11b may include the same material as that of the common electrode CE in the same process.

The second connection wires W12 and W22 may include the same material in the same process as that of the common voltage transmission line CVL. The second connection wires W12 and W22 may be unitary with the common voltage transmission line CVL. The second connection wires W12 and W22 may include a metal.

The first connection wires W11 and W21 and the second connection wires W12 and W22 may be disposed in the non-display area NA, which is the outer part of the display panel 10, and may be disposed outside the common electrode CE and the common voltage transmission line CVL.

The first pad TP11, the second pad TP12, the first connection wire W11, and the second connection wire W12 may be disposed above the display area DA, and the first pad TP21, the second pad TP22, the first connection wire W21, and the second connection wire W22 may be disposed below the display area DA. However, the positions of the pads TP11, TP12, TP21, and TP22 may be variously changed. In an embodiment, the first pad TP11 and the second pad TP12 may be disposed below the display area DA, for example. In this case, the first connection wire W11 may connect the first pad TP11 and an upper end of the common electrode CE while extending along a side surface of the display area DA, and the second connection wire W12 may connect the second pad TP12 and an upper end of the common voltage transmission line CVL while extending along a side surface of the display area DA.

Figure 9:
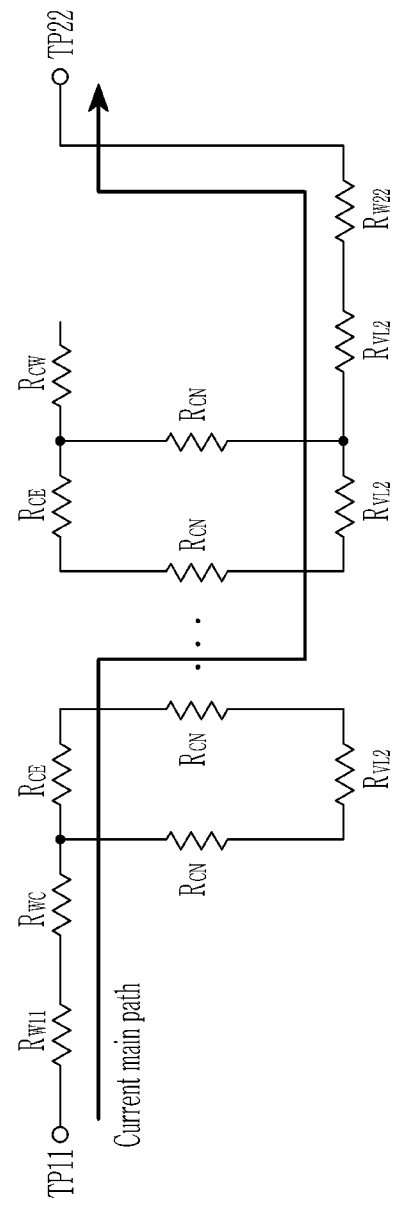
FIG. 9 is an equivalent circuit diagram of resistance between the pads TP11 and TP22 in FIG. 4.

FIG. 9 is an equivalent circuit diagram of resistance between the pads TP11 and TP22 in FIG. 4.

Referring to FIG. 9, together with FIG. 4, in order to determine whether the contact resistance between the common electrode CE and the common voltage lines VL2 is abnormal, the resistance between the first pad TP11 and the second pad TP22 disposed above and below the display area DA, or the resistance between the second pad TP12 and the first pad TP21, may be measured, respectively. A resistor $R_{W11}$ of first connection wire W11, a contact resistor $R_{C_W}$ of the first connection wire W11 and the common electrode CE, a contact resistor $R_{CW}$ of the common electrode, a contact resistor $R_{CE}$ of the common electrode CE, a contact resistor $R_{CN}$ of the common electrode CE and the common voltage line VL2, a resistance of the common voltage line VL2, a contact resistor $R_{CW}$ of the common electrode CE and the second connection wire W22, a resistor $R_{W22}$ of the second connection wire W22, and a resistor $R_{VL2}$ of the common voltage line VL2 may exist between the first pad TP11 and the second pad TP22. The resistors between the first pad TP11 and the second pad TP22 may be connected as shown in FIG. 4. In particular, the resistor $R_{W11}$ may be coupled to the contact resistor $R_{WC}$ in series, or the resistor $R_{CE}$ and the contact resistor $R_{CN}$ may be coupled in parallel to the contact resistor $R_{WC}$.

The contact resistor $R_{CN}$ may be lower than the resistor $R_{CE}$ of the common electrode CE, which may include a transparent conductive oxide. Accordingly, when a voltage (e.g., a common voltage) is applied, a current flowing through a contact portion of the common electrode CE and the common voltage line VL2 may be greater than a current flowing through the common electrode CE, and as shown in the drawing, a current main path passing through the contact portion in the display area DA may be defined. Therefore, it is possible to monitor the contact resistor $R_{CN}$ and determine whether the contact resistor $R_{CN}$ is abnormal, and through this, it is possible to predict a voltage drop and an image quality characteristic in the display area DA. In an embodiment, the monitoring of the contact resistor $R_{CN}$ using first pad TP11 and the second pad TP22 may be performed before connecting a driving apparatus such as a driver IC chip 30 to the display panel 10. However, even when the display panel 10 is driven after the driving apparatus is connected, the characteristic of the display panel 10 may be maintained the same in terms of resistance with respect to the common voltage.

Figure 10:
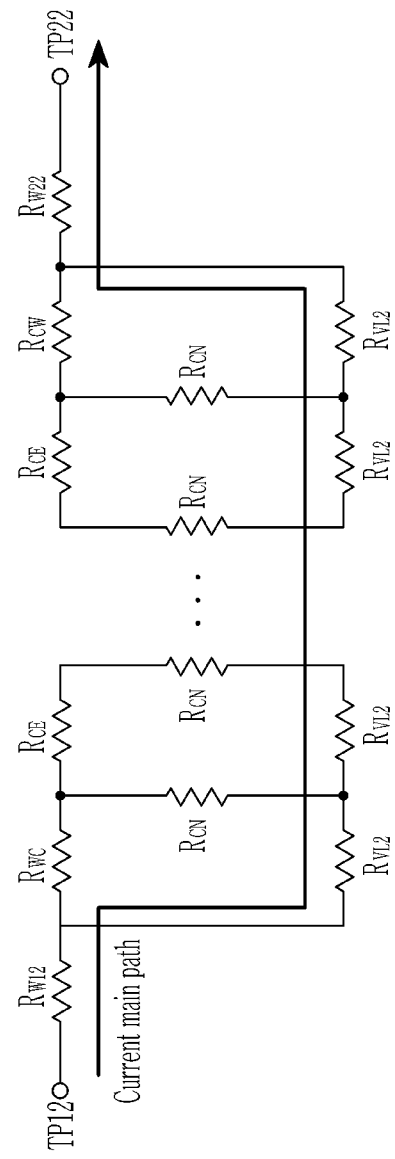
FIG. 10 is an equivalent circuit diagram of resistors between the pads TP12 and TP22 in FIG. 4.

FIG. 10 is an equivalent circuit diagram of resistors between the pads TP12 and TP22 in FIG. 4.

Referring to FIG. 10 a connection of resistance between the second pad TP12 and the second pad TP22 respectively disposed above and below the display area DA are illustrated.

Since the second pad TP12 is connected with the common voltage transmission line CVL by the second connection wire W12, the second pad TP12 may be connected with the resistor $R_{W12}$ of the second connection wire W12. The resistor $R_{W12}$ may be coupled in parallel with the contact resistor $R_{WC}$ of the second connection wire W12 and the resistor $R_{VL2}$ of the common voltage line VL2.

The contact resistor $R_{WC}$ may be coupled in parallel with the resistor $R_{CE}$ of the common electrode CE and the contact resistor $R_{CN}$ of the common voltage line VL2. The resistor $R_{VL2}$ of the common electrode CE, which may include a transparent conductive oxide, may be substantially small compared to the resistor $R_{CE}$ of the common voltage line VL2, which may include a metal. Accordingly, when a voltage is applied to the second pad TP12 and the second pad TP22, most of the current may flow without passing through the contact portion of the common electrode CE and the common voltage line VL2, and as shown in the drawing, a current main path passing through the contact portion may be defined in the display area DA. Accordingly, it is not possible to inspect or repair the contact resistor $R_{CN}$-related problem in the display area DA. However, as described with reference to FIG. 9, the contact resistor $R_{CN}$ may be monitored and abnormality of the contact resistor $R_{CN}$ may be determined by measuring the resistance between the first pads TP11 and TP21 connected to the common electrode CE and the second pads TP12 and TP22 connected to the common voltage transmission line CVL.

Figure 11:
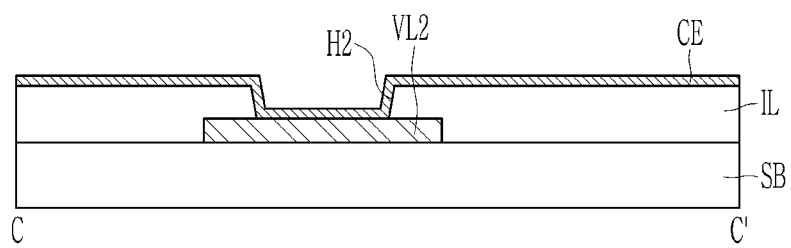
FIG. 11 and FIG. 12 illustrate connections between common electrodes CE and common voltage lines VL2 in display areas DA, respectively.
Figure 12:
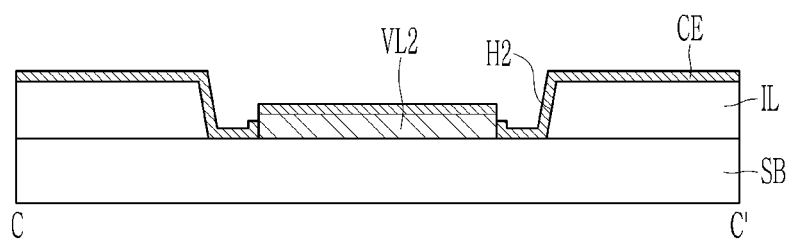

FIG. 11 and FIG. 12 are schematic cross-sectional views of an embodiment, taken along line C-C' in FIG. 4.

FIG. 11 and FIG. 12 illustrate connections between common electrodes CE and common voltage lines VL2 in display areas DA, respectively. Referring to FIG. 11, an insulation layer IL is disposed on a common voltage line VL2, and a common electrode CE may be connected to a common voltage line VL2 through a contact hole H2 defined in the insulation layer IL. Unlike the embodiment of FIG. 7 in which the contact member CM2 is disposed between the common electrode CE and the common voltage line VL2, the common electrode CE may be directly connected to the common voltage line VL2, i.e., the common electrode CE may contact the common voltage line VL2.

Referring to FIG. 12, the insulation layer IL is disposed on the common voltage line VL2, and a contact hole H2 that exposes a side surface of the common voltage line VL2 may be defined in the insulation layer IL. The common electrode CE may contact a side surface of the common voltage line VL2. Such a structure may be formed or provided, for example, by slanting deposition of the common electrode CE or by a thickness difference between the common electrode CE and the common voltage line VL2. When the common electrode CE contacts the side of common voltage line VL2, it may be desired to determine whether stable contact resistance is formed or provided because the contact area is small and process management is difficult. Thus, as in the above-described embodiment, first pads TP11 and TP21 connected to the common electrode CE and second pads TP12 and TP22 connected to the common voltage transmission line CVL are formed or provided in the non-display area NA, and the resistance between the first pads TP11 and TP21 and the second pads TP12 and TP22 is measured to thereby monitor contact resistance and predict a voltage drop and a consequent image quality characteristic.

Figure 13:
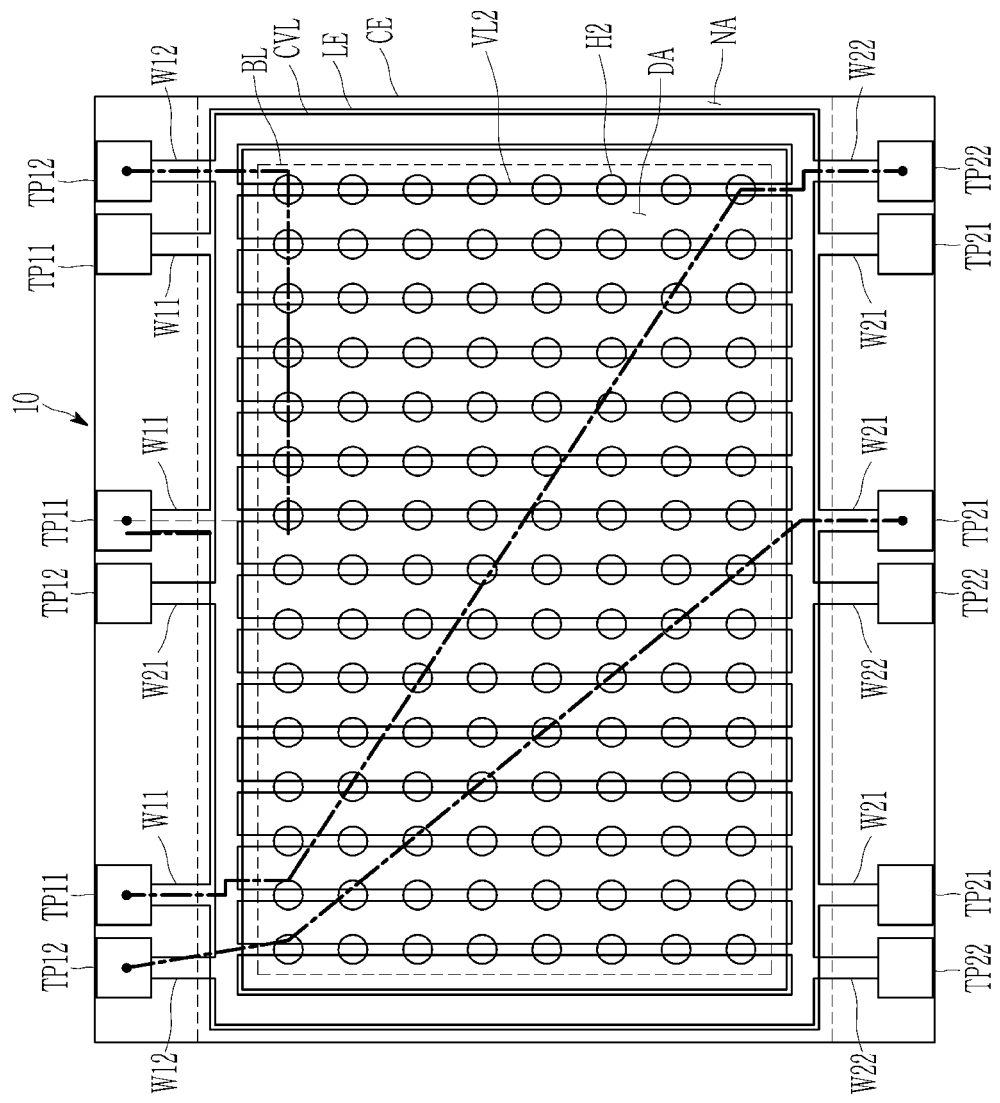
FIG. 13 is a schematic top plan view of an embodiment of a display panel.

FIG. 13 is a schematic top plan view of an embodiment of a display panel.

Referring to FIG. 13, three first pads TP11 and three second pads TP12 illustrated shown above the display area DA, and three first pads TP21 and three second pads TP22 are illustrated below the display area DA. As described, a plurality of pads TP11, TP12, TP21, and TP22 may be provided, and when the number of pads TP11, TP12, TP21, and TP22 is large, the contact resistance between the common electrode CE and the common voltage line VL2 for each region may be monitored in the display area DA.

In an embodiment, when measuring the resistance between the first pad TP11 disposed in a center on the upper side of the display area DA and the second pad TP12 disposed on the right side, a contact resistance of about an upper right region of the display area DA may be monitored. When measuring the resistance between the second pad TP12 disposed at the upper left of the display area DA and the first pad TP21 disposed at a lower center of the display area DA, a contact resistance of the region extending from the upper left to the lower middle of the display area DA may be monitored. In such a way, it is possible to estimate a region where a contact failure occurs and repair the contact failure by selecting one of a plurality of first pads TP11 and TP21 and one of a plurality of second pads TP12 and TP22 and measuring resistances at opposite ends. In any case, when the resistance between one of the first pads TP11 and TP21 and one of the second pads TP12 and TP22 is measured, the contact resistance may be monitored in the entire display area DA or in a predetermined region of the display area DA.

Figure 14:
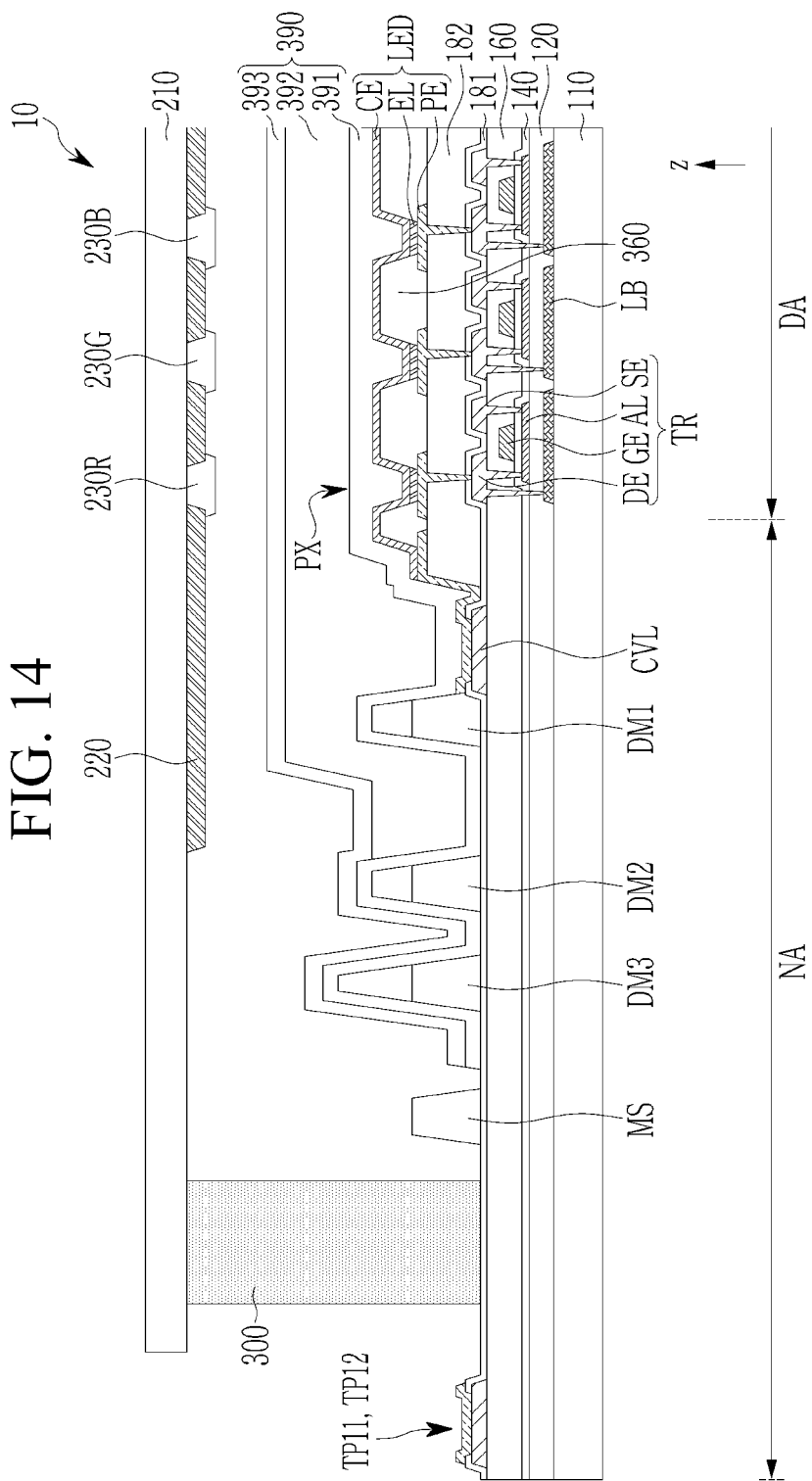
FIG. 14 is a schematic cross-sectional view of an embodiment of a pixel area in a display panel.

FIG. 14 is a schematic cross-sectional view of an embodiment of a pixel area in a display panel.

Referring to FIG. 14, a cross-section at the periphery of an upper edge of a display panel 10 is illustrated. The display panel 10 may include a substrate 110, a transistor TR formed or disposed on the substrate 110, and a light-emitting diode LED connected to the transistor TR. The substrate 110 may correspond to the above-described substrate SB. The light-emitting diode LED may correspond to a pixel PX. The display panel 10 may include an upper substrate 210, and a sealant 300 bonding the substrate 110 and the upper substrate 210. Although a lot of pixels are disposed in the display area DA of the display panel 10, only three pixels are briefly illustrated to avoid drawing complexity. In addition, although each pixel PX of the display area DA includes transistors, a capacitor, and a light-emitting diode, one transistor TR and one light-emitting diode LED connected thereto are illustrated and described.

The substrate 110 may be a rigid substrate including glass, quartz, ceramic, or the like. In an embodiment, the substrate 110 may be a flexible substrate including a polymer such as a polyimide, a polyamide, or a polyethylene terephthalate.

A first conductive layer including a light-blocking layer LB may be disposed on the substrate 110. The light-blocking layer LB prevents external light from reaching a semiconductor layer AL of the transistor TR, thereby preventing the characteristic deterioration of the semiconductor layer AL. It is possible to control the leakage current of the driving transistor in which the current characteristic is important in the transistor TR, particularly the emissive display device, by the light-blocking layer LB. In an embodiment, the first conductive layer may include a metal such as molybdenum (Mo), aluminum (Al), copper (Cu), titanium (T1), or the like, and may be a single layer or multiple layers.

The buffer layer 120 may be disposed on the light-blocking layer LB. When the semiconductor layer AL is formed or provided, the buffer layer 120 blocks impurities from the substrate SB to improve the characteristics of the semiconductor layer AL, and it may relieve the stress of the semiconductor layer AL by flattening the surface of the substrate SB. In an embodiment, the buffer layer 120 may include an inorganic insulating material such as a silicon nitride ($SiN_x$), a silicon oxide ($SiO_x$), a silicon oxynitride ($SiO_xN_y$), or the like. The buffer layer 120 may include amorphous silicon.

The semiconductor layer AL of the transistor TR may be disposed on the buffer layer 120. The semiconductor layer AL may include a first region, a second region, and a channel region disposed between the first and second regions. The semiconductor layer AL may include polysilicon, amorphous silicon, or an oxide semiconductor.

A gate insulation layer 140 may be disposed on the semiconductor layer AL. In an embodiment, the gate insulation layer 140 may include an inorganic insulating material such as a silicon oxide, a silicon nitride, or a silicon oxynitride, and may be a single layer or multiple layers.

A second conductive layer including a gate electrode GE may be disposed on the gate insulation layer 140. The second conductive layer may further include gate lines GL1 and GL2. In the specification, constituent elements included in a predetermined conductive layer may mean that they include the same material in the same process. The gate electrode GE may overlap the channel region of the semiconductor layer AL. In an embodiment, the first conductive layer may include a metal such as molybdenum (Mo), aluminum (Al), copper (Cu), titanium (Ti), or the like, and may be a single layer or multiple layers.

An inter-insulation layer 160 may be disposed on the gate insulation layer 140 and the second conductive layer. In an embodiment, the inter-insulation layer 160 may include an inorganic insulating material such as a silicon oxide, a silicon nitride, or a silicon oxynitride, and may be a single layer or multiple layers. When the inter-insulation layer 160 is a multilayer, a lower layer may include a silicon nitride, and an upper layer may include a silicon oxide.

A third conductive layer including a first electrode SE and a second electrode DE of the transistor TR may be disposed on the inter-insulation layer 160. The third conductive layer may further include a common voltage transmission line CVL, a driving voltage transmission line DVL, a data line DL, a driving voltage line VL1, a common voltage line VL2, and/or an initialization voltage line VL3. One of the first electrode SE and the second electrode DE may be a source electrode of the transistor TR, and the other may be a drain electrode of the transistor TR. The first electrode SE and the second electrode DE may be respectively connected to the first region and the second region of the semiconductor layer AL through contact holes defined in the inter-insulation layer 160 and the gate insulation layer 140. One of the first electrode SE and the second electrode DE may be connected to the light-blocking layer LB through a contact hole defined in the inter-insulation layer 160, the gate insulation layer 140, and the buffer layer 120. In an embodiment, the third conductive layer may include a metal such as aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (T1), tungsten (W), and copper (Cu), and may be a single layer or multiple layers. In an embodiment, the third conductive layer may include a lower layer including a refractory metal such as molybdenum, chromium, tantalum, and titanium, an intermediate layer including a metal having low resistivity such as aluminum, copper, and silver, and an upper layer including a refractory metal. In an embodiment, the third conductive layer may have a triple layer structure such as titanium/aluminum/titanium (Ti/Al/Ti).

A passivation layer 181 may be disposed on the third conductive layer. In an embodiment, the passivation layer 181 may include an inorganic insulating material such as a silicon nitride, a silicon oxide, or a silicon oxynitride, and may be a single layer or multiple layers. In an alternative embodiment, the passivation layer 181 may be omitted.

A planarization layer 182 may be disposed on the passivation layer 181. In an embodiment, the planarization layer 182 may include an organic insulation material such as a general-purpose polymer such as poly(methyl methacrylate) or polystyrene, polymer derivatives with phenolic groups, acryl-based polymers, imide-based polymers, polyimides, acryl-based polymers, siloxane-based polymers, or the like.

A fourth conductive layer including a pixel electrode PE of a light-emitting diode LED may be disposed on the planarization layer 182. The pixel electrode PE may be connected to the second electrode DE of the transistor TR through a contact hole defined in the planarization layer 182 and the passivation layer 181. The fourth conductive layer may include a reflective or semi-transmissive conducting material, or may include a transparent conductive material. In an embodiment, the fourth conductive layer may include a transparent conductive material such as an ITO, an IZO, or the like. In an embodiment, the fourth conductive layer may include a metal such as lithium (Li), calcium (Ca), aluminum (Al), silver (Ag), magnesium (Mg), or gold (Au). In an embodiment, the fourth conductive layer may have a multi-layer structure, for example, it may have a triple-layer structure such as ITO/Ag/ITO.

One of the first conductive layer to the third conductive layer may include first electrode layers L11 and L21 of the aforementioned pads TP11, TP12, TP21, and TP22. In an embodiment, the pads TP11, TP12, TP21, and the first electrode layers L11 and L21 of TP22 may include the same material in the same process as that of the light-blocking layer LB, the gate electrode GE of the transistor TR, the first electrode SE and the second electrode DE of the transistor TR, and the data line DL.

The fourth conductive layer may include the aforementioned contact members CM1 and CM2, first connection wires W11 and W21, and/or second electrode layers L12 and L22 of pads TP11, TP12, TP21, and TP22. In an embodiment, the contact member CM1 and CM2, the first connection wires W11 and W21, and/or the second electrode layers L12 and L22 may include the same material as that of the pixel electrode PE in the same process. When the first connection wire W11 includes a first portion W11a and a second portion W11b, the first portion W11a may be included in the first conductive layer to the third conductive layer, and the second portion W11b may be included in the fourth conductive layer.

The above-described insulation layer IL may include at least one of the buffer layer 120, the gate insulation layer 140, the inter-insulation layer 160, the passivation layer 181, and the planarization layer 182.

A pixel defining layer 360 (also referred to as a partition or a bank) in which an opening overlapping with the pixel electrode PE is defined may be disposed on the planarization layer 182. The pixel defining layer 360 may cover an edge of the pixel electrode PE. In an embodiment, the pixel defining layer 360 may include an organic insulating material such as an acryl-based polymer, an imide-based polymer, or an amide-based polymer. The pixel defining layer 360 may be a black pixel defining layer 360 including a black pigment. In an embodiment, the pixel defining layer 360 may include a polyimide binder and a pigment mixed with red, green, and blue. The pixel defining layer 360 may include a combination of a cardo binder resin and a lactam black pigment and blue pigment. The pixel defining layer 360 may include carbon black. The black pixel defining layer 360 may improve a contrast ratio and prevent reflection by the underlying metal layer.

An emission layer EL may be disposed on the pixel electrode PE. In an embodiment, the emission layer EL may include a material layer that uniquely emits light of primary colors such as red, green, and blue. The emission layer EL may have a structure in which material layers emitting light of different colors are stacked. In addition to the emission layer EL, at least one of a hole injection layer, a hole transport layer, an electron transport layer, and an electron injection layer may be disposed on the pixel electrode PE.

The common electrode CE (also referred to as an opposed electrode) may be disposed on the emission layer EL and the pixel defining layer 360. The common electrode CE may be disposed over a plurality of pixels PX. In an embodiment, the common electrode CE may include a metal such as calcium (Ca), barium (Ba), magnesium (Mg), aluminum (Al), silver (Ag), platinum (Pt), palladium (Pd), gold (Au), nickel (Ni), neodymium (Nd), iridium (Ir), chromium (Cr), lithium (Li), or the like. In an embodiment, the common electrode CE may include a transparent conductive oxide such as an ITO, an IZO, or the like.

The pixel electrode PE, the emission layer EL, and the common electrode CE may form an organic light-emitting diode OLED, which may be a light-emitting diode LED. The pixel electrode PE may be an anode, which is a hole injection electrode, and the common electrode CE may be a cathode, which is an electron injection electrode. However, the invention is not limited thereto, and in another embodiment, the pixel electrode PE may be a cathode, which is a hole injection electrode, and the common electrode CE may be an anode. The opening of the pixel defining layer 360 overlapping the pixel electrode PE may correspond to the emission area of the light-emitting diode LED.

The encapsulation layer 390 may be disposed on the common electrode CE. The encapsulation layer 390 may prevent the penetration of moisture or oxygen from the outside by sealing the light-emitting diode LED. The encapsulation layer 390 covers the entire display area DA, and an edge of the encapsulation layer 390 may be disposed in the non-display area NA. The encapsulation layer 390 may be a thin film encapsulation layer including at least one inorganic layer and at least one organic layer. In an embodiment, the encapsulation layer 390 may have a triple layer structure including a first inorganic layer 391, an organic layer 392, and a second inorganic layer 393, for example. The first inorganic layer 391 and the second inorganic layer 393 may be formed or provided wider than the organic layer 392, and the first inorganic layer 391 and the second inorganic layer 393 may contact each other near the edge of the encapsulation layer 390. The edge of the first inorganic layer 391 and the edge of the second inorganic layer 393 may approximately coincide. Penetration of moisture or oxygen from the side of the display area DA may be prevented by forming the first inorganic layer 391 and the second inorganic layer 393 widely, and the penetration may be delayed by making the penetration path of moisture or oxygen long and complicated.

Dams DM1, DM2, and DM3 that surround the display area DA and are spaced apart from each other may be disposed in the non-display area NA. In an embodiment, the dams DM1, DM2, and DM3 may prevent the organic material such as monomers from overflowing when forming the organic layer 392 of the encapsulation layer 390, and thus the edge of the organic layer 392 of the encapsulation layer 390 may be disposed more inside than the dams DM1, DM2, and DM3, that is, between the dams DM1, DM2, and DM3 and the display area DA. The dams DM1, DM2, and DM3 may include at least one layer. The dams DM1, DM2, and DM3 may be formed or provided using an insulation layer formed or provided in the display area DA. In an embodiment, when the dams DM1, DM2, and DM3 are formed or provided as a single layer, the dams DM1, DM2, and DM3 may include the same material as that of the planarization layer 182 or the pixel defining layer 360 in the same process. When the dams DM1, DM2, and DM3 are formed or provided in multiple layers, the lower layer and the upper layer may include the same material as that of the planarization layer 182 or the pixel defining layer 360 in the same process, respectively.

In the non-display area NA, a mask support MS may be disposed. The emission layer EL, the common electrode CE, and the first and second inorganic layers 391 and 393 of the encapsulation layer 390 may be deposited using a metal mask in which a region in which the corresponding layer is to be formed or provided is open. The mask support MS may support the metal mask. The mask support MS may be disposed farther from the display area DA than the dams DM1, DM2, and DM3. The mask support MS may include the same material as that of the planarization layer 182 or the pixel defining layer 360 in the same process.

The upper substrate 210 may be a rigid substrate including glass, quartz, ceramic, or the like. The upper substrate 210 may be a plastic substrate. The upper substrate 210 may be spaced apart from the encapsulation layer 390 by a predetermined distance.

A light-blocking member 220, a first color conversion layer 230R, a second color conversion layer 230G, a transmission layer 230B, or the like may be disposed on the upper substrate 210 in a direction toward the substrate 110.

The light-blocking member 220 may be formed or provided in an approximate pixel area (e.g., a region excluding a region overlapping the emission layer EL), and may provide a light-blocking region in a region excluding the pixel area. On the upper substrate 210, a color filter (e.g., a red color filter, a green color filter, and a blue color filter) to increase the purity of the light emitted to the outside of the display panel 10 may be further disposed, and a light-blocking region may be provided by overlapping the color filter instead of the light-blocking member 220.

A first color conversion layer 230R, a second color conversion layer 230G, and a transmission layer 230B may be disposed separately from each other in a space separated by a bank (not shown). The first color conversion layer 230R may overlap the light-emitting diode LED corresponding to the first pixel, and may convert light incident from the light-emitting diode LED into light of a first wavelength. In an embodiment, the light of the first wavelength may be red light having a maximum light-emitting peak wavelength of about 600 nanometers (nm) to about 650 nm, for example, about 620 nm to about 650 nm. The second color conversion layer 230G may overlap the light-emitting diode LED corresponding to the second pixel, and may convert light incident from the light-emitting diode LED into light having a second wavelength. In an embodiment, the light of the second wavelength may be green light having a maximum light-emitting peak wavelength of about 500 nm to about 550 nm, for example about 510 nm to about 550 nm. The transmissive layer 230B may overlap the light-emitting diode LED corresponding to a third pixel and transmit light incident from the light-emitting diode LED. The light passing through the transmission layer 230B may be light of a third wavelength. In an embodiment, the light of the third wavelength light may be a blue light of which a maximum light-emitting peak wavelength is about 380 nm to about 480 nm, for example, about 420 nm or more, about 430 nm or more, about 440 nm or more, or about 445 nm or more, and about 470 nm or less, about 460 nm or less, or about 455 nm or less.

The first color conversion layer 230R and the second color conversion layer 230G may include first quantum dots and second quantum dots, respectively. In an embodiment, first light incident to the color conversion layer 230R may be converted into light of a first wavelength by the first quantum dots and emitted. Light incident to the second color conversion layer 230G may be converted into light of a second wavelength by the second quantum dots and emitted. The first color conversion layer 230R, the second color conversion layer 230G, and the transmission layer 230B may include scatterers. The scatterers may improve light efficiency by scattering light incident on the first color conversion layer 230R, the second color conversion layer 230G, and the transmission layer 230B.

The sealant 300 bonding the substrate 110 and the upper substrate 210 may be disposed around the edge of the display panel 10. The sealant 300 completely surrounds the display area DA. In an embodiment, the sealant 300 may prevent impurities such as moisture and oxygen from penetrating between the substrate 110 and the upper substrate 210 from the outside. Therefore, the display area DA may be sealed with air-tightness by the substrate 110, the upper substrate 210, and the sealant 300 disposed therebetween. The sealant 300 may be formed or provided by printing the sealing material of the substrate 110 or the upper substrate 210, overlapping the substrate 110 and the upper substrate 210, and then curing the sealing material. In an embodiment, the sealing material may include an organic material such as an epoxy resin, a phenolic resin, an acryl resin, or a urethane resin. The sealing material may be light curable and/or heat curable. In an embodiment, as the sealing material, an inorganic material such as glass frit may be used. As described above, since the display area DA is also sealed by the encapsulation layer 390, the display area DA may be double sealed.

While embodiments of the invention have been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A display device comprising:
a substrate including a display area and a non-display area surrounding the display area;
a common voltage transmission line which is disposed in the non-display area and transmits a common voltage;
a common voltage line disposed in the display area and connected with the common voltage transmission line;
a common electrode disposed in the display area and the non-display area and connected with the common voltage line;
a first pad disposed in the non-display area and connected with the common electrode; and
a second pad disposed in the non-display area and connected with the common voltage transmission line.

2. The display device of claim 1, wherein
the first pad is connected with the common electrode by a first connection wire, and
the second pad is connected with the common voltage transmission line by a second connection wire.

3. The display device of claim 2, wherein
each of the first pad and the second pad comprises a first electrode layer and a second electrode layer disposed on the first electrode layer.

4. The display device of claim 3, wherein
the first connection wire extends from the second electrode layer of the first pad, and
the second connection wire extends from the first electrode layer of the second pad.

5. The display device of claim 3, wherein
the first connection wire is unitary with the second electrode layer of the first pad, and
the second connection wire is unitary with the first electrode layer of the second pad and the common voltage transmission line.

6. The display device of claim 2, further comprising:
a conductive layer disposed on the substrate and including a metal;
an insulation layer disposed on the conductive layer; and
a pixel electrode disposed on the insulation layer,
wherein the first connection wire includes a same material in a same process as that of the pixel electrode, while the second connection wire includes a same material in a same process as that of the conductive layer.

7. The display device of claim 2, further comprising:
a conductive layer disposed on the substrate and including a metal;
an insulation layer disposed on the conductive layer; and
a pixel electrode disposed on the insulation layer,
wherein the first connection wire includes a first portion including a same material in a same process as that of the conductive layer and a second portion including a same material in a same process as that of the pixel electrode.

8. The display device of claim 1, wherein
the first pad and the second pad are respectively disposed at a first side and a second side of the display area.

9. The display device of claim 1, wherein
the first pad and the second pad are disposed at a side of the display area.

10. The display device of claim 1, further comprising:
an insulation layer disposed on the common voltage line,
wherein the common electrode is connected to the common voltage line through a contact hole defined in the insulation layer.

11. The display device of claim 10, further comprising:
a pixel electrode disposed on the insulation layer; and
a contact member disposed between the common voltage line and the common electrode and contacting the common voltage line through the contact hole,
wherein the contact member includes a same material in a same process as that of the pixel electrode.

12. The display device of claim 1, wherein
the common electrode contacts a side surface of the common voltage line.

13. A display device comprising:
a substrate including a display area and a non-display area surrounding the display area;
a common voltage transmission line which is disposed in the non-display area and transmits a common voltage;
a common voltage line disposed in the display area and connected with the common voltage transmission line;
an insulation layer disposed on the common voltage transmission line and the common voltage line;
a pixel electrode disposed on the insulation layer;
a common electrode disposed in the display area and the non-display area and electrically connected with the common voltage line;
a first connection wire disposed in the non-display area and connected with the common electrode; and
a second connection wire disposed in the non-display area and connected with the common voltage transmission line.

14. The display device of claim 13, further comprising:
a conductive layer disposed between the substrate and the insulation layer, and including a metal, wherein the first connection wire includes a portion including a same material in a same process as that of the pixel electrode, and the second connection wire includes a portion including a same material in a same process as that of the conductive layer.

15. The display device of claim 13, wherein
the first connection wire has a triple layer structure of a transparent conductive oxide layer, a metal layer, and a transparent conductive oxide layer.

16. The display device of claim 13, wherein
the first connection wire and the second connection wire are respectively disposed at a first side and a second side of the display area.

17. The display device of claim 13, further comprising:
a first pad disposed in the non-display area and connected with the first connection wire; and
a second pad disposed in the non-display area and connected with the second connection wire.

18. The display device of claim 17, wherein
each of the first pad and the second pad comprises a first electrode layer and a second electrode layer disposed on the first electrode layer,
the first connection wire extends from the second electrode layer of the first pad, and
the second connection wire extends from the first electrode layer of the second pad.

19. The display device of claim 17, wherein
the first connection wire is unitary with the second electrode layer of the first pad, and
the second connection wire is unitary with the first electrode layer of the second pad and the common voltage transmission line.

20. The display device of claim 13, wherein
the common voltage transmission line surrounds the display area, and opposite ends of the common voltage line are connected with the common voltage transmission line.

* * * * *